US012333970B2

(12) United States Patent
Hwang et al.

(10) Patent No.: US 12,333,970 B2
(45) Date of Patent: Jun. 17, 2025

(54) METHOD OF DETERMINING A GATE VOLTAGE OF A DISPLAY DEVICE, AND DISPLAY DEVICE

(71) Applicant: Samsung Display Co., LTD., Yongin-si (KR)

(72) Inventors: Jun-Ho Hwang, Yongin-si (KR); Hyungjun An, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/643,641

(22) Filed: Apr. 23, 2024

(65) Prior Publication Data

US 2025/0095525 A1 Mar. 20, 2025

(30) Foreign Application Priority Data

Sep. 20, 2023 (KR) ........................ 10-2023-0125954

(51) Int. Cl.
*G09G 3/00* (2006.01)
*G09G 3/20* (2006.01)

(52) U.S. Cl.
CPC ........... *G09G 3/006* (2013.01); *G09G 3/2007* (2013.01); *G09G 2320/02* (2013.01); *G09G 2330/028* (2013.01)

(58) Field of Classification Search
CPC ......... G09G 3/006; G09G 3/2007; G09G 3/20
See application file for complete search history.

(56) References Cited

U.S. PATENT DOCUMENTS 10,997,909 B2 * 5/2021 Pyo ...................... G09G 3/3233

FOREIGN PATENT DOCUMENTS

KR 102469801 B1 11/2022

* cited by examiner

*Primary Examiner* — Sardis F Azongha
(74) *Attorney, Agent, or Firm* — CANTOR COLBURN LLP

(57) ABSTRACT

In a method of determining a gate voltage of a display device, gamma reference voltages including a black data voltage are determined by performing a multi-time programming (MTP) operation on the display device, copy mura pattern data are provided to the display device, a luminance curve of the gate voltage is obtained by measuring luminance of the display device while gradually changing the gate voltage, a peak gate voltage is determined corresponding to a peak point of the luminance curve, and a final gate voltage is determined based on the black data voltage and the peak gate voltage.

20 Claims, 8 Drawing Sheets

FIG. 4

| SEQUENCE | VGH |
|---|---|
| 1 | HVGH(6.9V) |
| 2 | 6.8V |
| 3 | 6.7V |
| 4 | 6.6V |
| 5 | 6.5V |
| 6 | 6.4V |
| 7 | 6.3V |
| 8 | 6.2V |
| 9 | 6.1V |
| 10 | 6.0V |
| 11 | 5.9V |
| 12 | 5.8V |
| 13 | 5.7V |
| 14 | 5.6V |
| 15 | 5.5V |
| 16 | 5.4V |
| 17 | 5.3V |
| 18 | 5.2V |
| 19 | 5.1V |
| 20 | 5.0V |
| 21 | 4.9V |
| 22 | 4.8V |
| 23 | 4.7V |
| 24 | 4.6V |
| 25 | LVGH(4.5V) |

METHOD OF DETERMINING A GATE VOLTAGE OF A DISPLAY DEVICE, AND DISPLAY DEVICE

This application claims priority to Korean Patent Application No. 10-2023-0125954, filed on Sep. 20, 2023, and all the benefits accruing therefrom under 35 U.S.C. § 119, the content of which in its entirety is herein incorporated by reference.

BACKGROUND

1. Field

Embodiments of the invention relate to a display device, and more particularly to a method of determining a gate voltage of a display device, and the display device using the gate voltage.

2. Description of the Related Art

A display device may include a display panel including a plurality of pixels, a data driver providing data voltages to the plurality of pixels, and a gate driver providing gate signals to the plurality of pixels. Each pixel in a selected pixel row may receive a data voltage in response to a gate signal having an active gate voltage (e.g., a low gate voltage), and may emit light based on the data voltage. Further, each pixel in a non-selected pixel row may receive a gate signal having an inactive gate voltage (e.g., a high gate voltage), and may not receive the data voltage for the pixel in the selected pixel row based on the gate signal having the inactive gate voltage.

SUMMARY

In a display device, if an inactive gate voltage (e.g., a high gate voltage) of a gate signal is not sufficiently higher than a data voltage, or if a threshold voltage of a transistor of a pixel in a non-selected pixel row is shifted, the data voltage may be undesirably applied to the pixel in the non-selected pixel row, and a copy mura defect may occur in which an image for the selected pixel row is displayed in the non-selected pixel row.

Some embodiments provide a method of determining a gate voltage capable of preventing a copy mura defect.

Some embodiments provide a display device capable of preventing a copy mura defect.

According to embodiments, a method of determining a gate voltage of a display device includes determining gamma reference voltages including a black data voltage by performing a multi-time programming (MTP) operation on the display device, providing copy mura pattern data to the display device, obtaining a luminance curve of the gate voltage by measuring luminance of the display device while gradually changing the gate voltage, determining a peak gate voltage corresponding to a peak point of the luminance curve, and determining a final gate voltage based on the black data voltage and the peak gate voltage.

In embodiments, the copy mura pattern data may be image data which causes a copy mura defect to occur in the display device when the gate voltage is lower than the peak gate voltage.

In embodiments, the copy mura pattern data may include black image data representing a 0-gray level with respect to at least one selected from an upper region and a lower region of a display panel of the display device, and image data representing a gray level higher than the 0-gray level with respect to a middle region of the display panel.

In embodiments, the luminance curve of the gate voltage may be obtained by measuring the luminance of the display device while gradually decreasing the gate voltage by a constant voltage interval from a highest gate voltage.

In embodiments, the luminance curve of the gate voltage may be obtained by measuring the luminance of the display device while gradually increasing the gate voltage by a constant voltage interval from a lowest gate voltage.

In embodiments, the luminance curve of the gate voltage may be obtained by using a luminance measuring device which is used to perform the MTP operation.

In embodiments, the peak gate voltage may be compared with the black data voltage.

In embodiments, the determining the final gate voltage may include determining the final gate voltage as a default gate voltage when the peak gate voltage is less than or equal to the black data voltage, and determining the final gate voltage based on the default gate voltage and a difference between the peak gate voltage and the black data voltage when the peak gate voltage is greater than the black data voltage.

In embodiments, the default gate voltage may correspond to a sum of the black data voltage and a default voltage margin.

In embodiments, the final gate voltage may be determined by adding the difference between the peak gate voltage and the black data voltage to the default gate voltage when the peak gate voltage is greater than the black data voltage.

According to embodiments, a display device includes a display panel including a plurality of pixels, a gamma reference voltage generator configured to generate gamma reference voltages including a black data voltage, a data driver configured to provide data voltages to the plurality of pixels based on the gamma reference voltages, and a gate driver configured to provide gate signals having a final gate voltage to the plurality of pixels. In such an embodiment, the gamma reference voltages are determined by performing a multi-time programming (MTP) operation on the display device. In such an embodiment, copy mura pattern data are provided to the display device, luminance of the display device is measured while gradually changing a gate voltage, and a luminance curve of the gate voltage is obtained. In such an embodiment, the final gate voltage is determined based on the black data voltage and a peak gate voltage corresponding to a peak point of the luminance curve.

In embodiments, the copy mura pattern data may be image data which causes a copy mura defect to occur in the display device when the gate voltage is lower than the peak gate voltage.

In embodiments, the copy mura pattern data may include black image data representing a 0-gray level with respect to at least one selected from an upper region and a lower region of a display panel of the display device, and image data representing a gray level higher than the 0-gray level with respect to a middle region of the display panel.

In embodiments, the luminance curve of the gate voltage may be obtained by measuring the luminance of the display device while gradually decreasing the gate voltage by a constant voltage interval from a highest gate voltage.

In embodiments, the luminance curve of the gate voltage may be obtained by measuring the luminance of the display device while gradually increasing the gate voltage by a constant voltage interval from a lowest gate voltage.

In embodiments, the luminance curve of the gate voltage may be obtained by using a luminance measuring device which is used to perform the MTP operation.

In embodiments, the final gate voltage may be determined by comparing the peak gate voltage with the black data voltage.

In embodiments, the final gate voltage may be determined as a default gate voltage when the peak gate voltage is less than or equal to the black data voltage, and the final gate voltage may be determined based on the default gate voltage and a difference between the peak gate voltage and the black data voltage when the peak gate voltage is greater than the black data voltage.

In embodiments, the default gate voltage may correspond to a sum of the black data voltage and a default voltage margin.

In embodiments, the final gate voltage may be determined by adding the difference between the peak gate voltage and the black data voltage to the default gate voltage when the peak gate voltage is greater than the black data voltage.

As described above, in a method of determining a gate voltage and a display device according to embodiments, copy mura pattern data may be provided to the display device, a luminance curve of the gate voltage may be obtained by measuring luminance of the display device while gradually changing the gate voltage, and a final gate voltage may be determined based on a black data voltage and a peak gate voltage corresponding to a peak point of the luminance curve. Accordingly, a copy mura defect may be effectively prevented in the display device that operates based on the final gate voltage. Further, an optimal final gate voltage may be determined for each of respective display devices.

BRIEF DESCRIPTION OF THE DRAWINGS

Illustrative, non-limiting embodiments will be more clearly understood from the following detailed description in conjunction with the accompanying drawings.

FIG. 4 is a diagram for describing an example of a gate voltage that is gradually changed to obtain a luminance curve.

DETAILED DESCRIPTION

Figure 1:
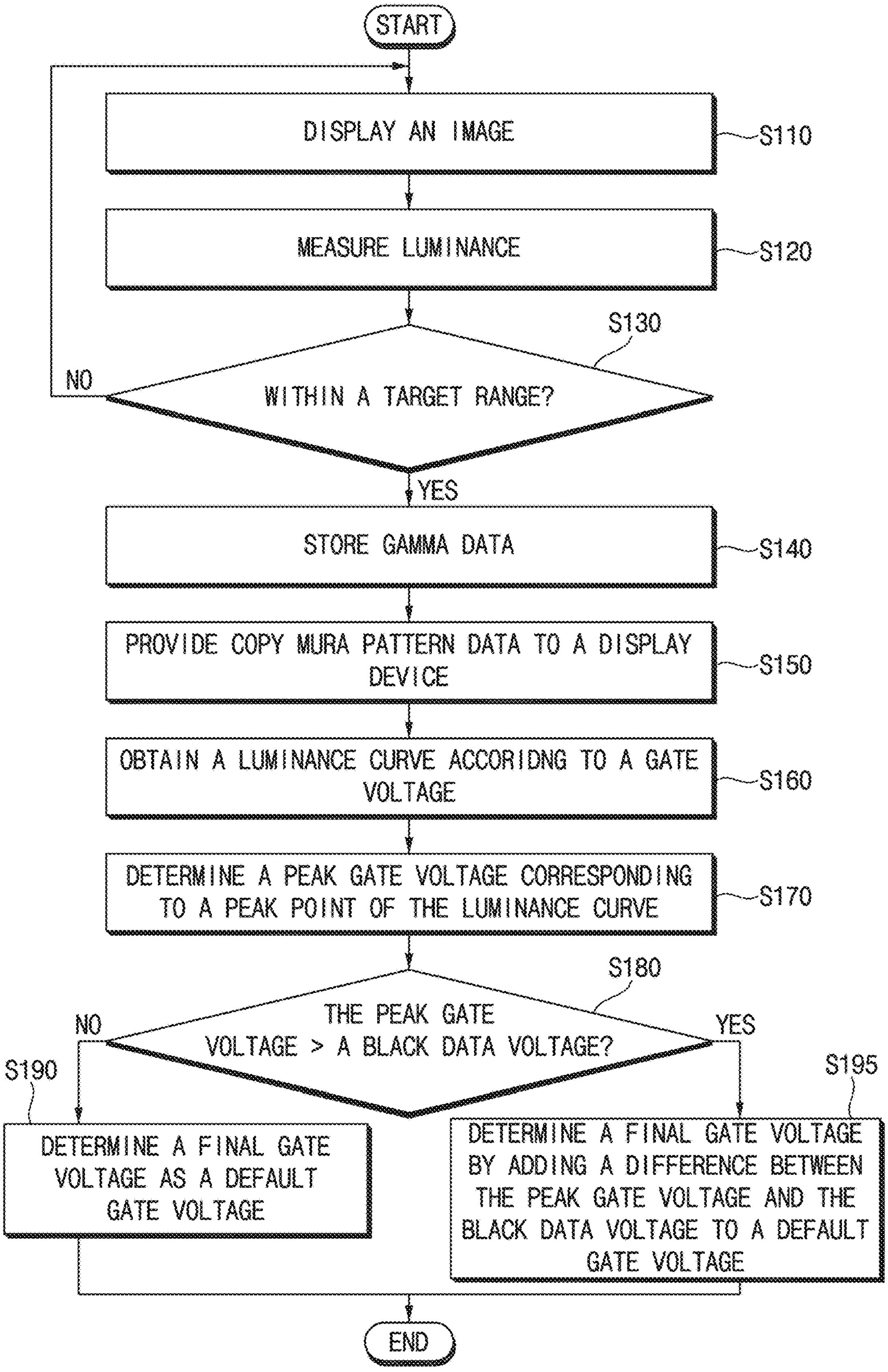
FIG. 1 is a flowchart illustrating a method of determining a gate voltage of a display device according to embodiments.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/of" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within +30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the invention will be described in detail with reference to the accompanying drawings.

Figure 2:
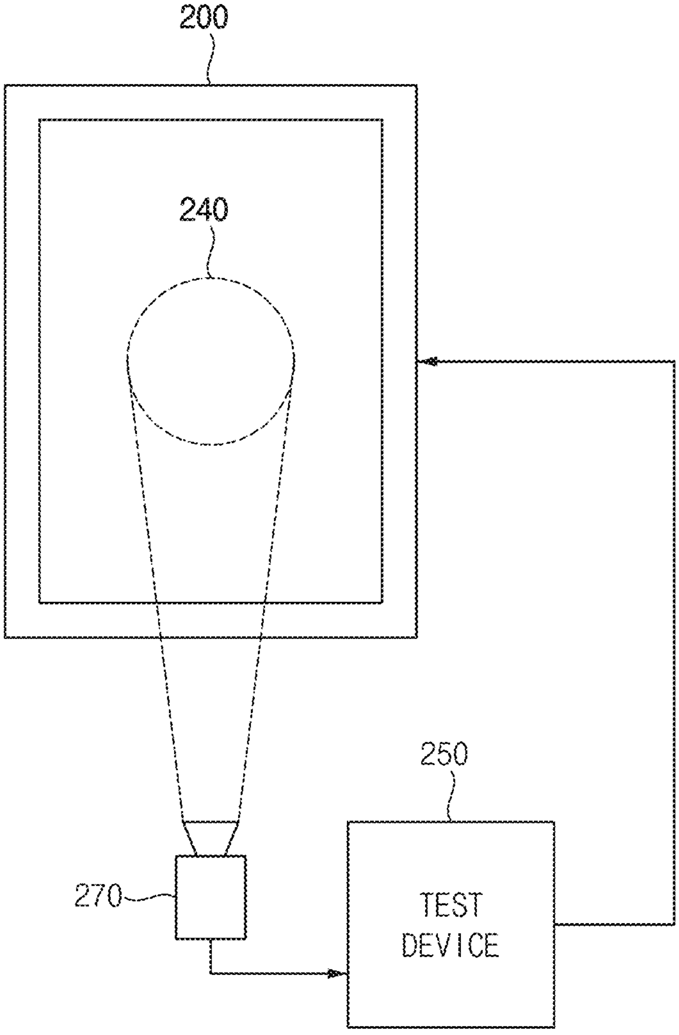
FIG. 2 is a block diagram illustrating a system for determining a gate voltage of a display device according to embodiments.
Figure 3:
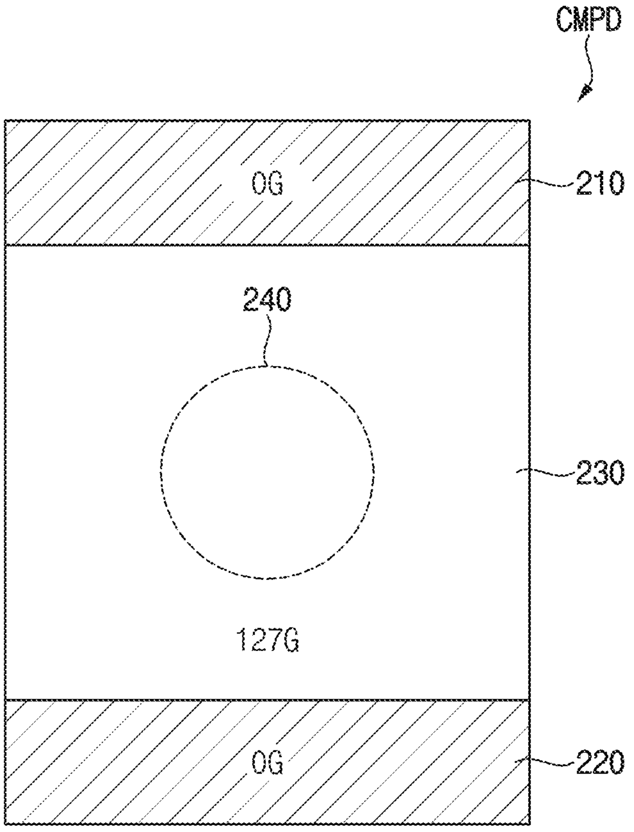
FIG. 3 is a diagram illustrating an example of copy mura pattern data.
Figure 5:
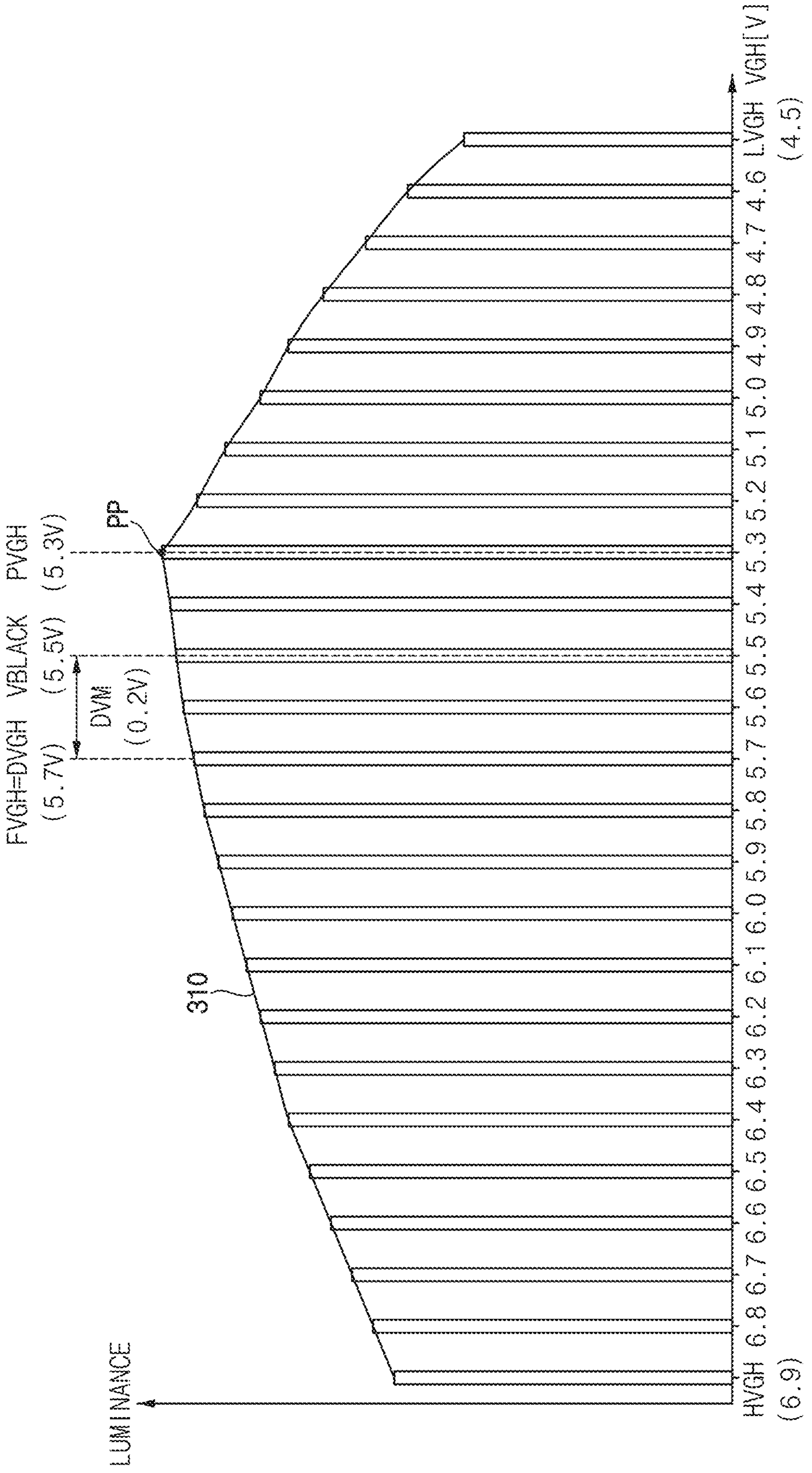
FIG. 5 is a diagram illustrating an example of a luminance curve of a gate voltage.
Figure 6:
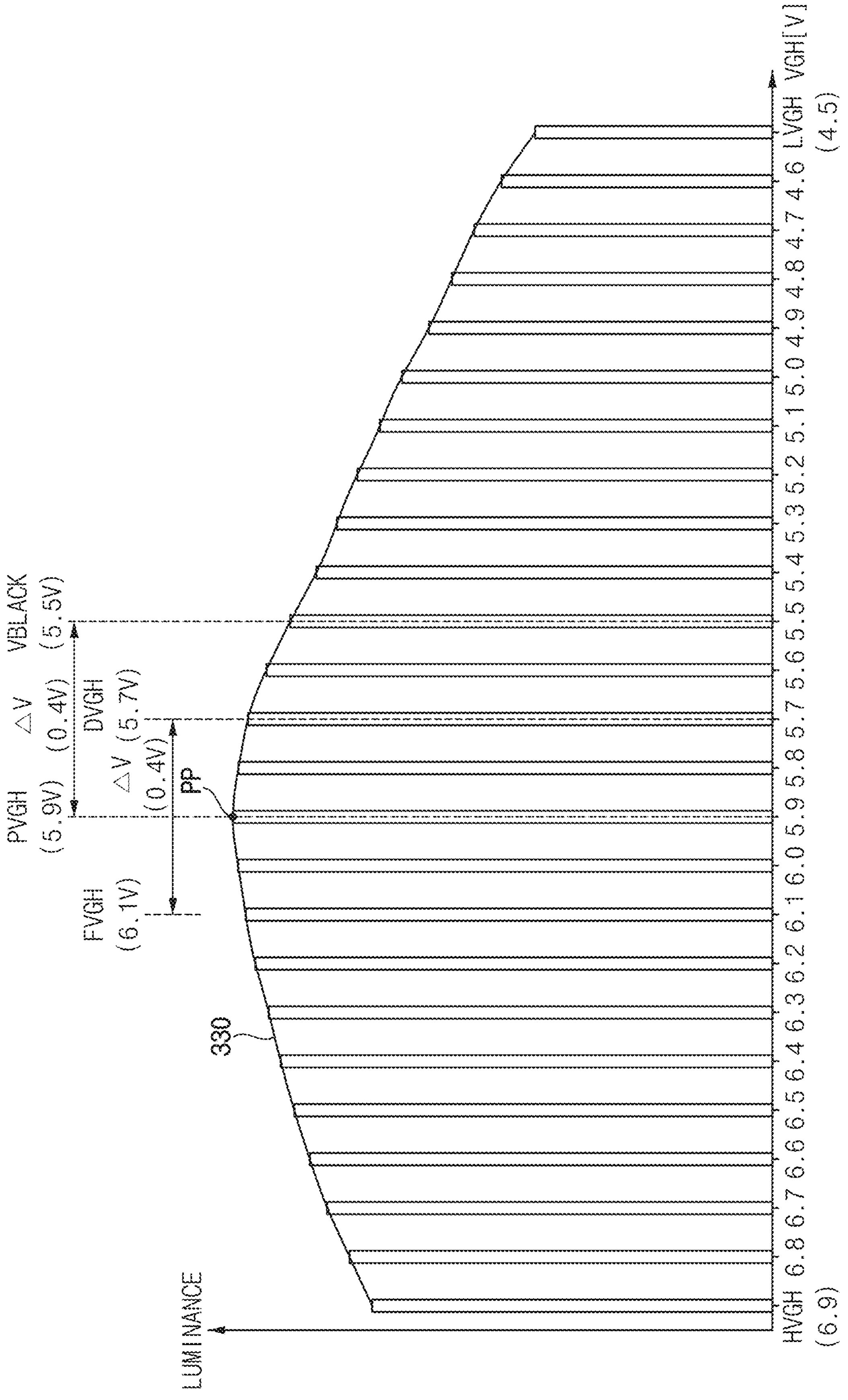
FIG. 6 is a diagram illustrating another example of a luminance curve of a gate voltage.

FIG. 1 is a flowchart illustrating a method of determining a gate voltage of a display device according to embodiments, FIG. 2 is a block diagram illustrating a system for determining a gate voltage of a display device according to embodiments, FIG. 3 is a diagram illustrating an example of copy mura pattern data, FIG. 4 is a diagram for describing an example of a gate voltage that is gradually changed to obtain a luminance curve, FIG. 5 is a diagram illustrating an example of a luminance curve of a gate voltage, and FIG. 6 is a diagram illustrating another example of a luminance curve of a gate voltage.

Referring to FIGS. 1 and 2, in a method of determining a gate voltage of a display device 200 according to embodiments, gamma reference voltages at reference gray levels may be determined by performing a multi-time programming (MTP) operation for the display device 200 (S110, S120, S130 and S140). The reference gray levels may include a 0-gray level, and the gamma reference voltages may include a black data voltage that is a gamma reference voltage at the 0-gray level (or a desired data voltage at the 0-gray level). In an embodiment, for example, the reference gray levels may include the 0-gray level, a 1-gray level, an 11-gray level, a 23-gray level, a 35-gray level, a 51-gray level, an 87-gray level, a 151-gray level, a 203-gray level and a 255-gray level, but are not limited thereto.

In some embodiments, to perform the MTP operation, the display device 200 may be driven to display an image at each of the reference gray levels (S110), and luminance and/or a color coordinate of the display device 200 may be measured (S120), and it may be determined whether the measured luminance and/or the measured color coordinate are within a desired target range (S130). In an embodiment, for example, as illustrated in FIG. 2, a test device 250 may provide test image data representing the reference gray level to the display device 200, the display device 200 may apply, as a data voltage, a predicted gamma reference voltage at the reference gray level to each pixel based on the test image data, and the test device 250 may measure the luminance of the display device 200 at a measurement point 240 by using a luminance measuring device 270. In some embodiments, the luminance measuring device 270 may be a luminance meter or a camera. If the measured luminance is outside the target range (S130: NO), the display device 200 may be again driven by changing the predicted gamma reference voltage (S110), and the luminance of the display device 200 corresponding to the changed gamma reference voltage may be measured again (S120). If the measured luminance is within the target range (S130: YES), gamma data indicating a value of the predicted gamma reference voltage may be generated, and the gamma data may be stored in the display device 200 (S140). These operations may be repeated until all of the gamma reference voltages at the reference gray levels are determined.

After the gamma reference voltages including the black data voltage are determined, the test device 250 may provide copy mura pattern data to the display device 200 (S150). In some embodiments, the copy mura pattern data may be image data that causes a copy mura defect to occur at the measurement point 240 of the display device 200 when the gate voltage does not have a desired voltage level (or when the gate voltage is lower than a peak gate voltage).

For example, as illustrated in FIG. 3, the copy mura pattern data CMPD may include black image data representing the 0-gray level 0G for at least one selected from an upper region 210 and a lower region 220 of a display panel of the display device 200. Further, the copy mura pattern data CMPD may include image data representing a gray level higher than the 0-gray level, for example, a 127-gray level 127G for a middle region 230 of the display panel of the display device 200. In a case where the gate voltage does not have the desired voltage level when the display device 200 displays an image based on the copy mura pattern data CMPD, a data voltage the upper region 210 and/or the lower region 220 may be applied or leaked to pixels in the middle region 230 including the measurement point 240, and the copy mura defect, in which the image in the upper region 210 and/or the lower region 220 is displayed also in the middle region 230 including the measurement point 240, may occur.

While the display device 200 displays an image based on the copy mura pattern data CMPD, a luminance curve of the gate voltage (i.e., a curve or graph showing luminance versus gate voltage) may be obtained by measuring the luminance of the display device 200 while gradually changing the gate voltage (S160). In some embodiments, each pixel of the display device 200 may include a P-type metal-oxide-semiconductor (PMOS) transistor, and the gate voltage may be a high gate voltage for turning off the PMOS transistor. Further, in some embodiments, the luminance curve of the gate voltage may be obtained by measuring the luminance of the display device 200 while gradually decreasing the gate voltage at a constant voltage interval from a predetermined highest gate voltage. For example, as illustrated in FIG. 4, the luminance of the display device 200 may be measured when the gate voltage VGH is the highest gate voltage HVGH of about 6.9 volts (V), and the luminance of the display device 200 may be repeatedly measured while decreasing the gate voltage VGH by a voltage interval of about 0.1 V. This decrease of the gate voltage VGH and the measurement of the luminance of the display device 200 may be repeated until the gate voltage VGH reaches a lowest gate voltage LVGH of about 4.5 V. Although FIG. 4 illustrates an embodiment in which the highest gate voltage HVGH is about 6.9 V, the voltage interval is about 0.1 V and the lowest gate voltage LVGH is about 4.5 V, the highest gate voltage HVGH, the voltage interval and the lowest gate voltage LVGH according to embodiments are not limited to those of FIG. 4. Alternatively, in other embodiments, the luminance curve of the gate voltage may be obtained by measuring the luminance of the display device 200 while gradually increasing the gate voltage VGH by a constant voltage interval from the lowest gate voltage LVGH. Further, in some embodiments, the luminance curve of the gate voltage VGH may be obtained by the luminance measuring device 270 that is used to perform the MTP operation. That is, the luminance measuring device 270 used to perform the MTP operation may measure the luminance of the display device 200 to obtain the luminance curve of the gate voltage VGH.

In an embodiment, the luminance curve is obtained, such that a peak gate voltage corresponding to a peak point of the luminance curve may be determined (S170). In some embodiments, when the gate voltage VGH is gradually decreased from the highest gate voltage HVGH, by a capacitive coupling between a line for transferring a gate signal having the gate voltage VGH and a gate electrode of a driving transistor of each pixel, a voltage of the gate electrode of the driving transistor may also gradually decreased, and thus the luminance of the display device 200 may be gradually increased. However, if the gate voltage VGH is excessively decreased, for example, if the gate voltage VGH reaches the peak gate voltage, the copy mura defect may occur in the middle region 230 including the measurement point 240, and the luminance of the middle region 230 including the measurement point 240 may be decreased. Thus, the luminance of the display device 200 at the measurement point 240 may be gradually increased as the gate voltage VGH gradually decreases from the highest gate voltage HVGH to the peak gate voltage, and may be gradually decreased as the gate voltage VGH gradually decreases from the peak gate voltage to the lowest gate voltage LVGH.

For example, as illustrated in FIG. 5, as the gate voltage VGH gradually decreases from the highest gate voltage HVGH to the peak gate voltage PVGH, the luminance curve 310 may gradually increase. Further, as the gate voltage VGH gradually decreases from the peak gate voltage PVGH to the lowest gate voltage LVGH, the luminance curve 310 may gradually decrease. The test device 250 may detect the peak point PP of the luminance curve 310, and may determine a gate voltage PVGH that causes the luminance curve 310 to have the peak point PP, or the peak gate voltage PVGH corresponding to the peak point PP.

In the method of determining the gate voltage according to embodiments, a final gate voltage FVGH may be determined based on the black data voltage VBLACK and the peak gate voltage PVGH (S180, S190 and S195). Here, the black data voltage VBLACK may be one of the gamma reference voltages determined by the MTP operation, and may be a data voltage at the 0-gray level.

In some embodiments, the peak gate voltage PVGH corresponding to the peak point PP may be compared with the black data voltage VBLACK determined by the MTP operation (S180). If the peak gate voltage PVGH is less than or equal to the black data voltage VBLACK (S180: NO), the final gate voltage FVGH may be determined as a default gate voltage DVGH (S190). In some embodiments, the default gate voltage DVGH may be calculated by adding a default voltage margin DVM to the black data voltage VBLACK. That is, the default gate voltage DVGH may correspond to a sum of the black data voltage VBLACK and the default voltage margin DVM.

For example, as illustrated in FIG. 5, in a case where the black data voltage VBLACK is determined as about 5.5 V by the MTP operation, and the peak gate voltage PVGH corresponding to the peak point PP of the luminance curve 310 is about 5.3 V, since the peak gate voltage PVGH of about 5.3 V is less than or equal to the black data voltage VBLACK of about 5.5 V, the final gate voltage FVGH may be determined as the default gate voltage DVGH of about 5.7 V that is calculated by adding the default voltage margin DVM of about 0.2 V to the black data voltage VBLACK of about 5.5 V.

If the peak gate voltage PVGH is greater than the black data voltage VBLACK (S180: YES), the final gate voltage FVGH may be determined based on the default gate voltage DVGH and a difference between the peak gate voltage PVGH and the black data voltage VBLACK (S195). In some embodiments, the final gate voltage FVGH may be determined by adding the difference between the peak gate voltage PVGH and the black data voltage VBLACK to the default gate voltage DVGH (S195).

For example, as illustrated in FIG. 6, in a case where the black data voltage VBLACK is determined as about 5.5 V by the MTP operation, and the peak gate voltage PVGH corresponding to the peak point PP of the luminance curve 330 is about 5.9V, the peak gate voltage PVGH may be higher than the black data voltage VBLACK by a difference ΔV of about 0.4V. If the peak gate voltage PVGH is higher than the black data voltage VBLACK, the final gate voltage FVGH may be determined as about 6.1 V by adding the difference ΔV of about 0.4 V between the peak gate voltage PVGH and the black data voltage VBLACK to the default gate voltage DVGH of about 5.7 V.

If the gate voltage VGH is determined as the default gate voltage DVGH that is lower than the peak gate voltage PVGH, the copy mura defect may occur in the display device 200. However, in the method of determining the gate voltage VGH of the display device 200 according to embodiments, the gate voltage VGH may be determined as the final gate voltage FVGH that is higher than the peak gate voltage PVGH, the copy mura defect can be effectively prevented or substantially reduced in the display device 200 according to embodiments.

Further, such a method of determining the gate voltage VGH may be performed for each of respective display devices. Thus, an optimal final gate voltage FVGH can be determined with respect to each of the respective display devices.

Figure 7:
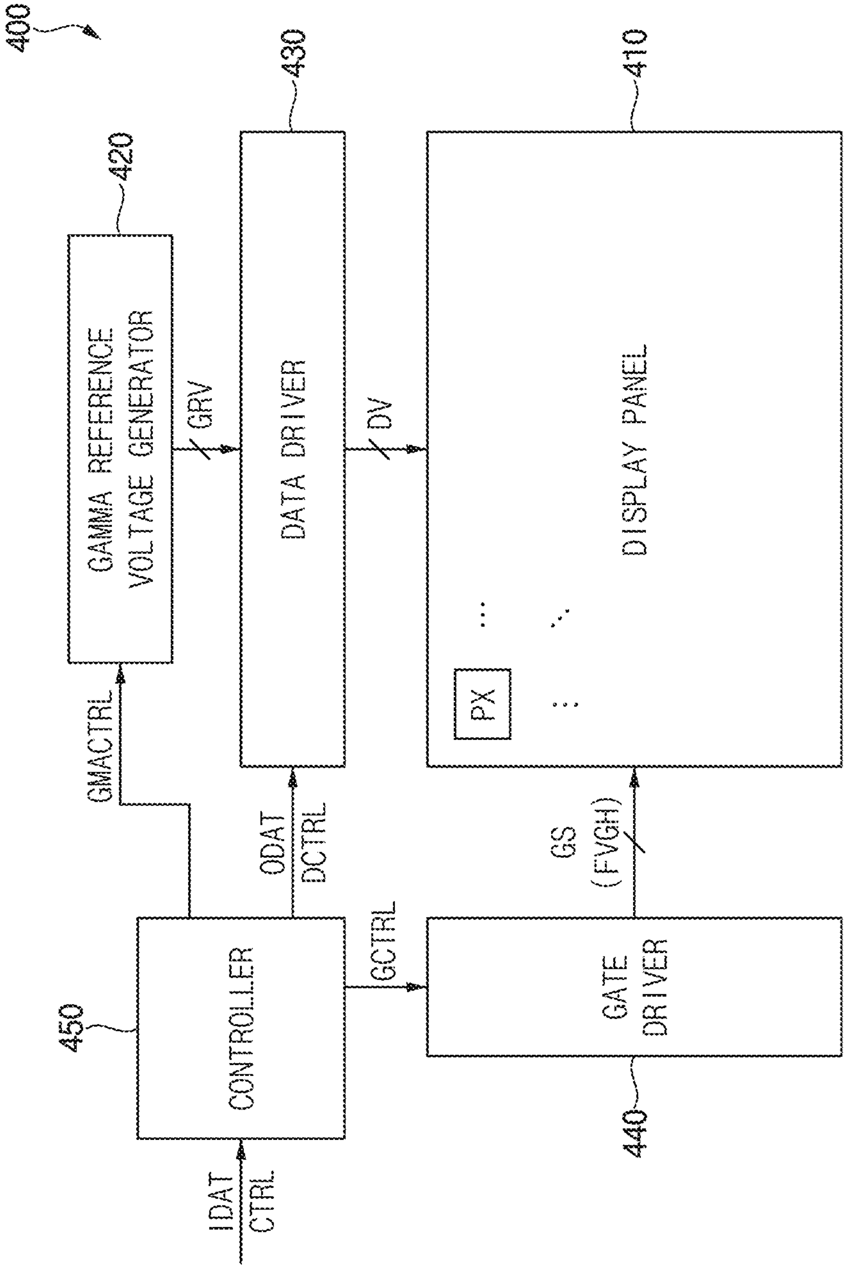
FIG. 7 is a block diagram illustrating a display device according to embodiments.

FIG. 7 is a block diagram illustrating a display device according to embodiments.

Referring to FIG. 7, a display device 400 according to embodiments may include a display panel 410 that includes a plurality of pixels PX, a gamma reference voltage generator 420 that generates gamma reference voltages GRV, a data driver 430 that provides data voltages DV to the plurality of pixels PX based on the gamma reference voltages GRV, a gate driver 440 that provides gate signals GS having a final gate voltage FVGH, and a controller 450 that controls an operation of the display device 400.

The display panel 410 may include the plurality of pixels PX that display an image. In some embodiments, each pixel PX may include at least one transistor, at least one capacitor and a light emitting element. In an embodiment, for example, each pixel PX may include an organic light emitting diode (OLED) as the light emitting element, and the display panel 410 may be an OLED display panel. In other examples, the light emitting element may be a nano light emitting diode (NED), a quantum dot (QD) light emitting diode, an inorganic light emitting diode, or any other suitable light emitting element. In other embodiments, the display panel 410 may be a liquid crystal display (LCD) panel, or any other suitable display panel.

The gamma reference voltage generator 420 may provide gamma reference voltages GRV at reference gray levels to the data driver 430 based on gamma data. In some embodiments, the gamma data may be generated by the MTP operation illustrated in FIG. 1, and the gamma reference voltage generator 420 may generate the gamma reference voltages GRV having values indicated by the gamma data. Further, in some embodiments, the reference gray levels may include a 0-gray level, and the gamma reference voltages GRV may include a black data voltage that is the data voltage DV at the 0-gray level. In some embodiments, the gamma reference voltage generator 420 may be included in the data driver 430 or the controller 450. In other embodiments, the gamma reference voltage generator 420 may be implemented as a separate integrated circuit.

The data driver 430 may receive output image data ODAT and a data control signal DCTRL from the controller 450, may receive the gamma reference voltages GRV from the gamma reference voltage generator 420, and may provide the data voltages DV to the plurality of pixels PX based on the output image data ODAT, the data control signal DCTRL and the gamma reference voltages GRV. In some embodiments, the data control signal DCTRL may include, but is not limited to, an output data enable signal, a horizontal start signal, and a load signal. The data driver 430 may divide the gamma reference voltage GRV at the reference gray levels to generate gray voltages at all gray levels, and may provide, as the data voltage DV, the gray voltage at the gray level indicated by the output image data ODAT to each pixel PX. In some embodiments, the data driver 430 and the controller 450 may be implemented as a single integrated circuit, and the single integrated circuit may be referred to as a timing controller embedded data driver (TED). In other embodiments, the data driver 430 and the controller 450 may be implemented as separate integrated circuits.

The gate driver 440 may generate the gate signals GS based on a gate control signal GCTRL received from the controller 450, and may sequentially provide the gate signals GS to the plurality of pixels PX on a row-by-row basis. In some embodiments, the gate control signal GCTRL may include, but is not limited to, a scan start signal, a scan clock signal, etc. In some embodiments, the gate signal GS may have a low gate voltage as a gate voltage for turning on a transistor of the pixel PX, and may have a final gate voltage FVGH determined by a method illustrated in FIG. 1 as a gate voltage for turning off the transistor of the pixel PX. In some embodiments, as described above with reference to FIGS. 1 through 6, copy mura pattern data may be provided to the display device 400, a luminance curve of the gate voltage may be obtained by measuring luminance of the display device 400 while gradually changing the gate voltage (e.g., a high gate voltage) of the gate signal GS. The final gate voltage FVGH of the gate signal GS may be determined based on the black data voltage and a peak gate voltage corresponding to a peak point of the luminance curve. In an embodiment, if the peak gate voltage is less than or equal to the black data voltage, the final gate voltage FVGH may be determined as a default gate voltage corresponding to a sum of the black data voltage and a default voltage margin. In such an embodiment, if the peak gate voltage is greater than the black data voltage, the final gate voltage FVGH may be determined by adding a difference between the peak gate voltage and the black data voltage to the default gate voltage. In some embodiments, the gate driver 440 may be integrated or formed in the display panel 410. In other embodiments, the gate driver 440 may be implemented as one or more integrated circuits.

The controller 450 (e.g., a timing controller) may receive input mage data IDAT and a control signal CTRL from an external host processor (e.g., a graphics processing unit (GPU), an application processor (AP), or a graphics card). In some embodiments, the input image data IDAT may be, but is not limited to, RGB image data including red image data, green image data and blue image data. Further, in some embodiments, the control signal CTRL may include, but is not limited to, a vertical synchronization signal, a horizontal synchronization signal, an input data enable signal and a master clock signal. The controller 450 may generate the output image data ODAT, a gamma control signal GMACTRL, the data control signal DCTRL and the gate control signal GCTRL based on the input image data IDAT and the control signal CTRL. The controller 450 may control the gamma reference voltage generator 420 by providing the gamma control signal GMACTRL to the gamma reference voltage generator 420, may control the data driver 430 by providing the output image data ODAT and the data control signal DCTRL to the data driver 430, and may control the gate driver 440 by providing the gate control signal GCTRL to the gate driver 440.

As described above, in the display device 400 according to embodiments, the copy mura pattern data may be provided to the display device 400, the luminance curve of the gate voltage may be obtained by measuring the luminance of the display device 400 while gradually changing the gate voltage (e.g., the high gate voltage), and the final gate voltage FVGH may be determined based on the black data voltage and the peak gate voltage corresponding to the peak point of the luminance curve. Accordingly, a copy mura defect may be prevented in the display device 400 driven based on the final gate voltage FVGH. Further, an optimal final gate voltage FVGH may be determined with respect to each display device.

Figure 8:
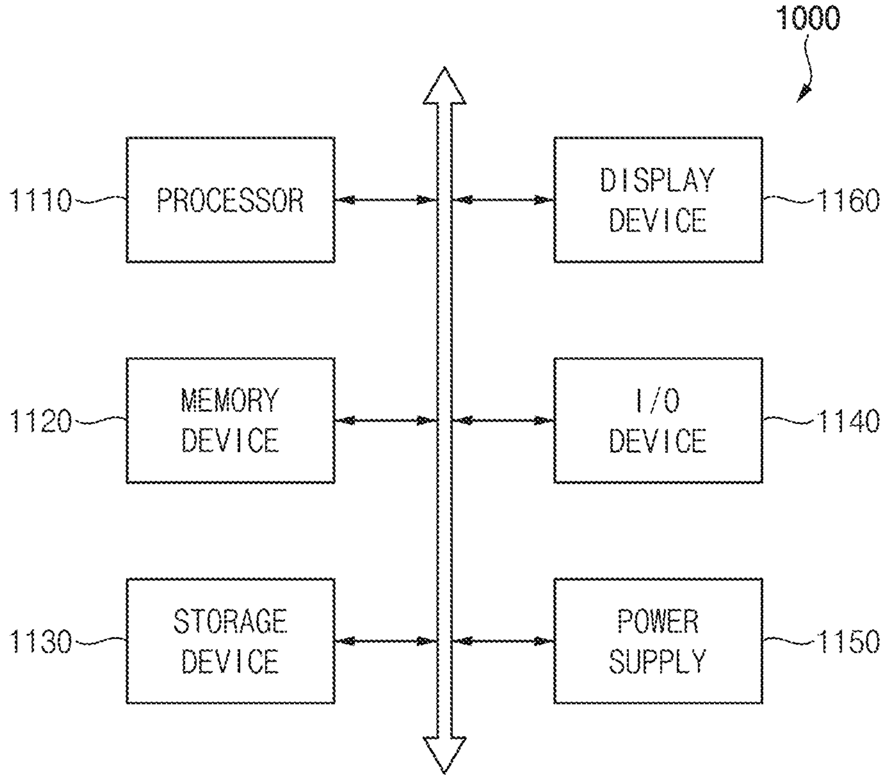
FIG. 8 is a block diagram illustrating an electronic device including a display device according to embodiments.

FIG. 8 is a block diagram illustrating an electronic device including a display device according to embodiments.

Referring to FIG. 8, an embodiment of an electronic device 1100 may include a processor 1110, a memory device 1120, a storage device 1130, an input/output (I/O) device 1140, a power supply 1150, and a display device 1160. The electronic device 1100 may further include a plurality of ports for communicating with a video card, a sound card, a memory card, a universal serial bus (USB) device, other electric devices, etc.

The processor 1110 may perform various computing functions or tasks. The processor 1110 may be an application processor (AP), a micro-processor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile dynamic random access memory (mobile DRAM) device, etc.

The storage device 1130 may be a solid state drive (SSD) device, a hard disk drive (HDD) device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, as described above with reference to FIGS. 1 to 6, copy mura pattern data may be provided to the display device 1160, a luminance curve of a gate voltage may be obtained by measuring luminance of the display device 1160 while gradually changing the gate voltage (e.g., a high gate voltage), and a final gate voltage may be determined based on a black data voltage and a peak gate voltage corresponding to a peak point of the luminance curve. Accordingly, a copy mura defect may be effectively prevented in the display device 1160 driven based on the final gate voltage. Further, an optimal final gate voltage may be determined with respect to each display device.

Embodiments of the inventions may be applied to any display device 1160, and any electronic device 1100 including the display device 1160, for example, a television (TV) (e.g., a digital TV, a 3D TV, etc.), a smart phone, a wearable electronic device, a tablet computer, a mobile phone, a personal computer (PC), a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A method of determining a gate voltage of a display device, the method comprising:
- determining gamma reference voltages including a black data voltage by performing a multi-time programming operation on the display device;
- providing copy mura pattern data to the display device;
- obtaining a luminance curve of the gate voltage by measuring luminance of the display device while gradually changing the gate voltage;
- determining a peak gate voltage corresponding to a peak point of the luminance curve; and
- determining a final gate voltage based on the black data voltage and the peak gate voltage.

2. The method of claim 1, wherein the copy mura pattern data are image data which causes a copy mura defect to occur in the display device when the gate voltage is lower than the peak gate voltage.

3. The method of claim 1, wherein the copy mura pattern data include black image data representing a 0-gray level with respect to at least one selected from an upper region and a lower region of a display panel of the display device, and image data representing a gray level higher than the 0-gray level with respect to a middle region of the display panel.

4. The method of claim 1, wherein the luminance curve of the gate voltage is obtained by measuring the luminance of the display device while gradually decreasing the gate voltage by a constant voltage interval from a highest gate voltage.

5. The method of claim 1, wherein the luminance curve of the gate voltage is obtained by measuring the luminance of the display device while gradually increasing the gate voltage by a constant voltage interval from a lowest gate voltage.

6. The method of claim 1, wherein the luminance curve of the gate voltage is obtained by using a luminance measuring device, which is used to perform the multi-time programming operation.

7. The method of claim 1, further comprising:
- comparing the peak gate voltage with the black data voltage.

8. The method of claim 7, wherein the determining the final gate voltage includes:
- determining the final gate voltage as a default gate voltage when the peak gate voltage is less than or equal to the black data voltage; and
- determining the final gate voltage based on the default gate voltage and a difference between the peak gate voltage and the black data voltage when the peak gate voltage is greater than the black data voltage.

9. The method of claim 8, wherein the default gate voltage corresponds to a sum of the black data voltage and a default voltage margin.

10. The method of claim 8, wherein the final gate voltage is determined by adding the difference between the peak gate voltage and the black data voltage to the default gate voltage when the peak gate voltage is greater than the black data voltage.

11. A display device comprising:
- a display panel including a plurality of pixels;
- a gamma reference voltage generator which generates gamma reference voltages including a black data voltage;
- a data driver which provides data voltages to the plurality of pixels based on the gamma reference voltages; and
- a gate driver which provides gate signals having a final gate voltage to the plurality of pixels,
- wherein the gamma reference voltages are determined by performing a multi-time programming operation on the display device,
- wherein copy mura pattern data are provided to the display device, luminance of the display device is measured while gradually changing a gate voltage, and a luminance curve of the gate voltage is obtained, and
- wherein the final gate voltage is determined based on the black data voltage and a peak gate voltage corresponding to a peak point of the luminance curve.

12. The display device of claim 11, wherein the copy mura pattern data are image data which causes a copy mura defect to occur in the display device when the gate voltage is lower than the peak gate voltage.

13. The display device of claim 11, wherein the copy mura pattern data include black image data representing a 0-gray level with respect to at least one selected from an upper region and a lower region of a display panel of the display device, and image data representing a gray level higher than the 0-gray level with respect to a middle region of the display panel.

14. The display device of claim 11, wherein the luminance curve of the gate voltage is obtained by measuring the luminance of the display device while gradually decreasing the gate voltage by a constant voltage interval from a highest gate voltage.

15. The display device of claim 11, wherein the luminance curve of the gate voltage is obtained by measuring the luminance of the display device while gradually increasing the gate voltage by a constant voltage interval from a lowest gate voltage.

16. The display device of claim 11, wherein the luminance curve of the gate voltage is obtained by using a luminance measuring device which is used to perform the multi-time programming operation.

17. The display device of claim 11, wherein the final gate voltage is determined by comparing the peak gate voltage with the black data voltage.

18. The display device of claim 17, wherein the final gate voltage is determined as a default gate voltage when the peak gate voltage is less than or equal to the black data voltage, and wherein the final gate voltage is determined based on the default gate voltage and a difference between the peak gate voltage and the black data voltage when the peak gate voltage is greater than the black data voltage.

19. The display device of claim 18, wherein the default gate voltage corresponds to a sum of the black data voltage and a default voltage margin.

20. The display device of claim 18, wherein the final gate voltage is determined by adding the difference between the peak gate voltage and the black data voltage to the default gate voltage when the peak gate voltage is greater than the black data voltage.

* * * * *